United States Patent [19]

Harpell et al.

[11] Patent Number: 4,737,401

[45] Date of Patent: Apr. 12, 1988

[54] BALLISTIC-RESISTANT FINE WEAVE FABRIC ARTICLE

[75] Inventors: Gary A. Harpell, Morristown; Igor Palley, Madison; Sheldon Kavesh, Whippany; Dusan C. Prevorsek, Morristown, all of N.J.

[73] Assignee: Allied Corporation, Morris Township, Morris County, N.J.

[21] Appl. No.: 825,038

[22] Filed: Dec. 9, 1985

Related U.S. Application Data

[63] Continuation-in-part of Ser. No. 710,340, Mar. 11, 1985, abandoned.

[51] Int. Cl.$^4$ .............................................. B32B 7/00
[52] U.S. Cl. ........................................ 428/252; 2/2.5; 428/113; 428/225; 428/229; 428/246; 428/247; 428/263; 428/265; 428/297; 428/298; 428/302; 428/911
[58] Field of Search ............... 428/225, 229, 246, 247, 428/252, 263, 265, 297, 298, 302, 911, 113; 2/2.5

[56] References Cited

U.S. PATENT DOCUMENTS

| 4,403,012 | 9/1983 | Harpell et al. | 428/911 |
| 4,457,485 | 7/1984 | Harpell et al. | 428/911 |
| 4,501,856 | 2/1985 | Harpell et al. | 525/240 |

OTHER PUBLICATIONS

R. C. Laible et al., "The Application of High Modulus Fibers to Ballistic Protection".

R. C. Laible, "Ballistic Materials and Penetration Mechanics", Elsevier Sci. Publishing Co., (1980), p. 81.
J. Macromel Sci. Chem. A7(1), pp. 295–322 (1973).
R. C. Laible, "Fibrous Armor", *Ballistic Materials and Penetration Mechanics*, Elsevier Scientific Publishing Co., 1980.
J. W. S. Hearle et al., "Ballistic Impact Resistance of Multi-Layer Textile Fabrics," *NTIS Acquisition No. AD A127641*, (1981).
Weiner et al., "Materials Evaluation Report No. 2781," U.S. Army Natick R&D Command, Ma. (1950).
Figuica, "Energy Absorption of Kevlar Fabrics Under Ballistic Impact", *NTIS Acquisition No. AD A090390*, (1980).

*Primary Examiner*—James J. Bell
*Attorney, Agent, or Firm*—Richard A. Negin; Gerhard Fuchs

[57] ABSTRACT

The present invention provides an improved article of manufacture which comprises at least one network of high strength, extended chain fiber or yarn selected from the group consisting of extended chain polyethylene (ECPE) extended chain polypropylene (ECPP) fibers, extended chain polyvinyl alcohol (PVA) fiber and extended chain polyacrylonitrile (PAN) fiber. The fibers and yarn have a denier of not more than about 500 and a tensile modulus of at least about 200 g/denier. The fibers and yarn preferably have a tensile modulus of at least about 500 grams/denier and an energy-to-break of at least about 22 Joules/gram. Optionally, a low modulus elastomeric material, which has a tensile modulus of less than about 6,000 psi, measured at about 23° C., substantially coats the fiber and yarn of the network.

23 Claims, No Drawings

BALLISTIC-RESISTANT FINE WEAVE FABRIC ARTICLE

This is a continuation-in-part of co-pending Ser. No. 710,340 filed 3-11-85 now abandoned.

BACKGROUND OF THE INVENTION

Ballistic resistant articles such as bulletproof vests, curtains, mats, raincoats and umbrellas containing high strength fibers are known. Fibers conventionally used include aramid fibers such as poly(phenylenediamine terephthalamide), nylon fibers, glass fibers and the like. For many applications, such as vests or parts of vests, the fibers are used in a woven or knitted fabric.

In "The Application of High Modulus Fibers to Ballistic Protection", R. C. Laible, et al., J. Macromol. Sci.-Chem. A7(1), pp. 295-322 1973, it is indicated on p. 298 that an important requirement is that the textile material have a high degree of heat resistance; for example, a polyamide material with a melting point of 255° C. appears to possess better impact properties ballistically than does a polyolefin fiber with equivalent tensile properties but a lower melting point.

R. C. Laible; "Fibrous armor," *Ballistic Materials and Penetration Mechanics,* Elsevier Scientific Publishing Co., 1980; provides an overview of the ballistic resistance performance of various fabrics. Liable discloses that among different silk fabrics, a fabric having a lower areal density would exhibit a small increase in ballistic resistance to .22 caliber fragments. See in particular, pp. 73-90 thereof. J. W. S. Hearle, et al.; "Ballistic Impact Resistance of Multi-Layer Textile Fabrics," NTIS Acquisition No. AD A127641, (1981); disclose that among nylon fabrics, those having greater areal density exhibited increased ballistic resistance. The findings of R. Sarson, et al.; 11th Commonwealth Defense Conference on Operational Clothing and Combat Equipment, India (1975); were in agreement with the findings of Hearle, et al. Weiner, et al.; "Materials Evaluation Report No. 2781," U.S. Army Natick R&D Command Ma. (1950); found no significant effect of fabric areal density on ballistic resistance. Figucia; "Energy Absorption of Kevlar Fabrics under Ballistic Impact" NTIS Acquisition No. AD A090390, (1980); discloses a limited study employing Kevlar fabric in which ballistic resistance increased with a decrease in fabric areal density. However, these results are not readily interpreted because the type of fabric weave was not held constant.

It is, therefore, apparent that there is no generally applicable relationship between fabric areal density and ballistic resistance.

BRIEF DESCRIPTION OF THE INVENTION

The present invention provides an improved, flexible, ballistic-resistant "soft" fabric armor. The fabric is comprised of at least one network layer of high strength, extended chain polyolefin (ECP) fibers selected from the group consisting of extended chain polyethylene (ECPE) and extended chain polypropylene (ECPP) fibers, extended chain polyvinyl alcohol (PVA) fiber, and extended chain polyacrylonitrile fiber. The fibers may be employed as such or arranged and configured to form yarn, the denier of the fiber or yarn being no more than about 500 and having a tensile modulus of at least about 200 g/denier. The fiber or yarn of the is employed to form the fabric. The fiber or yarn of the fabric are optionally coated with a low modulus elastomeric material which has a tensile modulus of less than about 6,000 psi (41,300 kPa).

Compared to conventional ballistic-resistant fabric structures, the fabric of the present invention can advantageously provide a selected level of ballistic protection while employing a reduced weight of protective material. Alternatively, the fabric of the present invention can provide increased ballistic protection when the article has a weight equal to the weight of a conventionally constructed piece of flexible fabric-type, soft armor.

DETAILED DESCRIPTION OF THE INVENTION

For the purposes of the present invention, a fiber is an elongate body the length dimension of which is much greater than the transverse dimensions of width and thickness. Accordingly, the term fiber includes monofilament and multifilament fiber, ribbon, strip, and the like having regular or irregular cross-section.

A ballistic resistant fabric of the present invention includes at least one network comprised of a high strength, ultra-high molecular weight, extended chain polyolefin (ECP) fiber, extended chain polyvinyl alcohol (PVA) fiber, and extended chain polyacrylonitrile (PAN) fiber. The fiber may be arranged and configured to form a yarn, provided the yarn denier is not more than about 500 and has a tensile modulus of at least about 200 g/denier. This yarn can be employed to form the fabric.

To further improve the ballistic resistance of the fabric, the fiber and yarn preferably have a denier of less than about 300, and more preferably have a denier of less than about 250. In addition, the fiber and yarn have a tensile modulus which preferably is at least about 1200 g/den, and more preferably is at least about 1800 g/den.

In another aspect of the invention, the fiber or yarn of the network is coated with a low modulus elastomeric material comprising an elastomer to provide improved ballistic resistance. This elastomeric material has a tensile modulus of less than about 6,000 psi (41,300 kPa), measured at about 23° C. Preferably, the tensile modulus of the elastomeric material is less than about 5,000 psi (34,500 kPa), more preferably, is less than 1,000 psi (6900 kPa) and most preferably is less than about 500 psi (3,450 kPa) to provide even more improved performance. The glass transition temperature (Tg) of the elastomer of the elastomeric material (as evidenced by a sudden drop in the ductility and elasticity of the material) is less than about 0° C. Preferably, the Tg of the elastomer is less than about −40° C., and more preferably is less than about −50° C. The elastomer also has an elongation to break (measured at about 23° C.) of at least about 50%. Preferably, the elongation to break is at least about 100%, and more preferably, it is about 300% for improved performance.

U.S. Pat. No. 4,457,985 generally discusses the high strength, high molecular weight, extended chain polyolefin fibers, employed in the present invention, and the disclosure of this patent is hereby incorporated by reference to the extent that it is not inconsistent herewith. More particularly, suitable polyethylene fibers are those having a molecular weight of at least 500,000, preferably at least one million and more preferably between two million and five million. Such extended chain polyethylene (ECPE) fibers may be grown in solution such as described in U.S. Pat. No. 4,137,394 to Meihuzen et al., or U.S. Pat. No. 4,356,138 of Kavesh et al., issued Oct. 26, 1982, or a fiber spun from a solution to form a gel structure, as described in German Off. Pat. No. 3,004,699 and GB Pat. No. 2051667, and especially as described in Application Ser. No. 572,607 of Kavesh et al. filed Jan. 20, 1984 (see EPA 64,167, published Nov. 10, 1982). Depending upon the formation technique, the draw ratio and temperatures, and other conditions, a variety of properties can be imparted to these fibers. The tenacity of the fibers should be at least 15 grams/denier, preferably at least 20 grams/denier, more preferably at least 25 grams/denier and most preferably at least 30 grams/denier. Similarly, the tensile modulus of the fibers, as measured by an Instron tensile testing machine, is at least 300 grams/denier, preferably at least 500 grams/denier and more preferably at least 1,000 grams/denier and most preferably at least 1,500 grams/denier. These highest values for tensile modulus and tenacity are generally obtainable only by employing solution grown or gel fiber processes. Many of the fibers have melting points higher than the melting point of the polymer from which they were formed. Thus, for example, ultra-high molecular weight polyethylenes of 500,000, one million and two million generally have melting points in the bulk of 138° C. The highly oriented polyethylene fibers made of these materials have melting points 7°–13° C. higher. Thus, a slight increase in melting point reflects the crystalline perfection of the fibers. Nevertheless, the melting points of these fibers remain substantially below nylon; and the efficacy of these fibers for ballistic resistant articles is contrary to the various teachings cited above which indicate temperature resistance as a critical factor in selecting ballistic materials.

Similarly, highly oriented, extended chain polypropylene (ECPP) fibers of molecular weight at least 750,000, preferably at least one million and more preferably at least two million may be used. Such ultra high molecular weight polypropylene may be formed into reasonably well oriented fibers by the techniques prescribed in the various references referred to above, and especially be the technique of U.S. Ser. No. 572,607, filed Jan. 20, 1984, of Kavesh et al. and commonly assigned. Since polypropylene is a much less crystalline material than polyethylene and contains pendant methyl groups, tenacity values achievable with polypropylene are generally substantially lower than the corresponding values for polyethylene. Accordingly, a suitable tenacity is at least 8 grams/denier, with a preferred tenacity being at least 11 grams/denier. The tensile modulus for polypropylene is at least 160 grams/denier, preferably at least 200 grams/denier. The melting point of the polypropylene is generally raised several degrees by the orientation process, such that the polypropylene fiber preferably has a main melting point of at least 168° C., more preferably at least 170° C. The particularly preferred ranges for the above-described parameters can advantageously provide improved performance in the final article.

As used herein, the terms polyethylene and polypropylene mean predominantly linear polyethylene and polypropylene materials that may contain minor amounts of chain branching or comonomers not exceeding 5 modifying units per 100 main chain carbon atoms, and that may also contain admixed therewith not more than about 25 wt% of one or more polymeric additives such as alkene-1-polymers; in particular, low density polyethylene, polypropylene or polybutylene, copolymers containing mono-olefins as primary monomers, oxidized polyolefins, graft polyolefin copolymers and polyoxymethylenes, or low molecular weight additives such as anti-oxidants, lubricants, ultra-violet screening agents, colorants and the like which are commonly incorporated therewith.

In the case of polyvinyl alcohol (PV-OH), PV-OH fiber of molecular weight of at least about 500,000, preferably at least about 750,000, more preferably between about 1,000,000 and about 4,000,000, and most preferably between about 1,500,000 and about 2,500,000 may be employed in the present invention. Particularly useful PV-OH fiber should have a modulus of at least about 300 g/denier, a tenacity of at least about 7 g/denier (preferably at least about 10 g/denier, more preferably at about 14 g/denier, and most preferably at least about 17 g/denier), and an energy to break of at least about 22 joules/g. PV-OH fibers having a weight average molecular weight of at least about 500,000, a tenacity of at least about 300 g/denier, a modulus of at least about 10 g/denier, and an energy to break of about 22 joules/g are more useful in producing a ballistic resistant article. PV-OH fiber having such properties can be produced, for example, by the process disclosed in U.S. patent application Ser. No. 569,818, filed Jan. 11, 1984, to Kwon et al., and commonly assigned.

In the case of polyacrylonitrile (PAN), PAN fiber of molecular weight of at least about 400,000, and preferably at least 1,000,000 may be employed. Particularly useful PAN fiber should have a tenacity of at least about 10 g/denier and an energy to break of at least about 22 joule/g. PAN fiber having a molecular weight of at least about 400,000, a tenacity of at least about 15–20 g/denier and an energy to break of at least about 22 joule/g is most useful in producing ballistic resistant articles; and such fibers are disclosed, for example, in U.S. Pat. No. 4,535,027.

For improved ballistic resistance of the fabric article, the fiber has a tensile modulus which preferably is at least about 500 g/den, more preferably is at least about 1000 g/den and most preferably is at least about 1300 g/den. Additionally, the ECP fiber has an energy-to-break which preferably is at least about 22 J/g, more preferably is at least about 50 J/g and most preferably is at least about 55 J/g.

In the fabric of the invention, the fiber network can have various configurations. For example, a plurality of fibers can be grouped together to form a twisted or untwisted yarn. The fibers or yarn may be formed as a felt, knitted or woven (plain, basket, satin and crow feet weaves, etc.) into a network, or formed into a network by any of a variety of conventional techniques. For example, the fibers may be formed into woven or nonwoven cloth layers by conventional techniques.

A preferred embodiment of the present invention includes multiple layers of elastomeric material coated fiber networks. The layers individually retain the high flexibility characteristic of textile fabrics and remain separate from each other. The multilayer article exhibits the flexibility of plied fabrics, and is readily distinguishable from the composite structures described in copending U.S. patent application Ser. No. 691,048 of Harpell, et al. and entitled "Ballistic Resistant Composite Article". Vests and other articles of clothing comprised of multiple layers of fabric constructed in accordance with the present invention have good flexibility and comfort coupled with excellent ballistic protection.

The flexibility of the ballistic resistant fabric structures of the present invention is demonstrated by the following test: A 30 cm square fabric sample comprised of multiple fabric layers having a total areal density of 2 kg/m², when clamped in a horizontal orientation along one side edge, will drape so that the opposite side edge is at least 21 cm below the level of the clamped side.

The multiple layers of fabric may be stitched together to provide a desired level of ballistic protection; for example, as against multiple ballistic impacts. However, stitching can reduce the flexibility of the fabric.

Coated fibers may be arranged (in the same fashion as uncoated fibers) into woven, non-woven or knitted fabrics. The fabric layers may be arranged in parallel arrays and/or incorporated into multilayer fabric articles. Furthermore, the fibers, used either alone or with coatings, may be wound or connected in a conventional fashion.

The proportion of coating in the fabric may vary from relatively small amounts (e.g. 0.1% by weight of fibers) to relatively large amounts (e.g. 60% by weight of fibers), depending upon whether the coating material has any ballistic-resistant properties of its own (which is generally not the case) and upon the rigidity, shape, heat resistance, wear resistance, flammability resistance and other properties desired for the fabric. In general, ballistic-resistant fabrics of the present invention containing coated fibers should have a relatively minor proportion of coating (e.g. 0.1–30%, by weight of fibers), since the ballistic-resistant properties are almost entirely attributable to the fiber. Nevertheless, coated fabrics with higher coating contents may be employed.

The coating may be applied to the fiber in a variety of ways. One method is to apply the neat resin of the coating material to the stretched high modulus fibers either as a liquid, a sticky solid or particles in suspension or as a fluidized bed. Alternatively, the coating may be applied as a solution or emulsion in a suitable solvent which does not adversely affect the properties of the fiber at the temperature of application. While any liquid capable of dissolving or dispersing the coating polymer may be used, preferred groups of solvents include water, paraffin oils, aromatic solvents or hydrocarbon solvents, with illustrative specific solvents including paraffin oil, xylene, toluene and octane. The techniques used to dissolve or disperse the coating polymers in the solvents will be those conventionally used for the coating of similar elastomeric materials on a variety of substrates.

Other techniques for applying the coating to the fibers may be used, including coating of the high modulus precursor (gel fiber) before the high temperature stretching operation, either before or after removal of the solvent from the fiber. The fiber may then be stretched at elevated temperatures to produce the coated fibers. The gel fiber may be passed through a solution of the appropriate coating polymer (solvent may be paraffin oil, aromatic or aliphatic solvent) under conditions to attain the desired coating. Crystallization of the high molecular weight polyethylene in the gel fiber may or may not have taken place before the fiber passes into the cooling solution. Alternatively, the fiber may be extruded into a fluidized bed of the appropriate polymeric powder.

If the fiber achieves its final properties only after a stretching operation or other manipulative process, e.g. solvent exchanging, drying or the like, it is contemplated that the coating may be applied to the precursor material. In this embodiment, the desired and preferred tenacity, modulus and other properties of the fiber should be judged by continuing the manipulative process on the fiber precursor in a manner corresponding to that employed on the coated fiber precursor. Thus, for example, if the coating is applied to the xerogel fiber described in U.S. application Ser. No. 572,607 of Kavesh et al., and the coated xerogel fiber is then stretched under defined temperature and stretch ratio conditions, the applicable fiber tenacity and fiber modulus values would be the measured values of an uncoated xerogel fiber which is similarly stretched.

A preferred coating technique is to form a network layer and then dip the network into a bath of a solution containing the low modulus elastomeric coating material. Evaporation of the solvent produces an elastomeric material coated fabric. The dipping procedure may be repeated as required to place a desired amount of elastomeric coating on the fibers.

A wide variety of elastomeric materials and formulations may be utilized in this invention. The essential requirement is that the elastomeric material have the appropriately low modulus. Representative examples of suitable elastomers of the elastomeric material have their structures, properties, formulations together with crosslinking procedures summarized in the *Encyclopedia of Polymer Science,* Volume 5 in the section "Elastomers-Synthetic" (John Wiley & Sons Inc., 1964). For example, any of the following materials may be employed: polybutadiene, polyisoprene, natural rubber, ethylene-propylene copolymers, ethylene-propylene-diene terpolymers, polysulfide polymers, polyurethane elastomers, chlorosulfonated polyethylene, polychloroprene, plasticized polyvinylchloride using dioctyl phthate or other plasticers well known in the art, butadiene acrylonitrile elastomers, poly(isobutylene-co-isoprene), polyacrylates, polyesters, polyethers, fluoroelastomers silicone elastomers, thermoplastic elastomers, copolymers of ethylene.

Particularly useful elastomers are block copolymers of conjugated dienes and vinyl aromatic monomers. Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type A-B-A, multiblock copolymers of the type $(AB)_n$(n=2-10) or radial configuration copolymers of the type $R-(BA)_x$(x=3-150); wherein A is a block from a polyvinyl aromatic monomer and B is a block from a conjugated diene elastomer. Many of these polymers are produced commercially by the Shell Chemical Co. and described in the bulletin "Kraton Thermoplastic Rubber", SC-68-81.

Most preferably, the elastomeric material consists of at least one of the above-mentioned elastomers. The low modulus elastomeric material may also include fillers such as carbon black, silica, etc. and may be extended with oils and vulcanized by sulfur, peroxide, metal oxide, or radiation cure systems using methods well known to rubber technologists. Blends of different elastomeric materials may be used together or one or more elastomer materials may be blended with one or more thermoplastics. High density, low density, and linear low density polyethylene may be cross-linked to obtain a matrix material of appropriate properties, either alone or as blends. In every instance, the modulus of the coating should not exceed about 6000 psi (41,300 kPa), preferably is less than about 5000 psi (34,500 kPa), more preferably is less than 100 psi (6900 kPa) and most preferably is less than about 500 psi (3450 kPa).

A coated yarn can be produced by pulling a group of fibers through the solution of low modulus elastomeric material to substantially coat each of the individual fibers, and then evaporating the solvent to form the coated yarn. The yarn can then be employed to form coated fabric layers which in turn, can be used to form desired multilayer fabric structures.

Multilayer fabric articles may be constructed and arranged in a variety of forms. It is convenient to characterize the geometries of such multilayer fabrics by the geometries of the fibers and then to indicate that substantially no matrix material, elastomeric or otherwise, occupies the region between fabric layers. One such suitable arrangement is a plurality of layers in which each layer is comprised of coated fabric fibers arranged in a sheet-like array and successive layers of such fabrics are rotated with respect to the previous layer. An example of such multilayer fabric structures is a five layered structure in which the second, third, fourth and fifth layers are rotated $+45°$, $-45°$, $90°$ and $0°$, with respect to the first layer, but not necessarily in that order. Other examples include multilayer fabrics with alternating fabric layers rotated $90°$ with respect to each other.

In various forms of the fabric of the invention, the fiber network occupies different proportions of the total volume of the fabric layer. Preferably, however, the fiber network comprises at least about 50 volume percent of the fabric layer, more preferably between about 70 volume percent, and most preferably at least about 90 volume percent. Similarly, the volume percent of low modulus elastomeric material in a fabric layer is preferably less than about 15 Vol %, more preferably is less than about 10 Vol %, and most preferably is less than about 5 Vol %.

The specific weight of the fabric layer is expressed in terms of the areal density (AD). This areal density corresponds to the weight per unit area of the fabric layer. Preferably, the fabric layer areal density is less than about $0.3$ kg/m$^2$; more preferably the areal density is less than about $0.2$ kg/m$^2$ and most preferably, the areal density is less than about $0.1$ kg/m$^2$.

It has been discovered that coated fabric comprised of strip or ribbon (fiber with an aspect ratio, ratio of fiber width to thickness, of at least about 5) can be even more effective than other forms of fiber or yarn when producing ballistic resistant articles. In particular embodiments of the invention, the aspect ratio of the strip is at least 50, preferably is at least 100 and more preferably is at least 150 for improved performance. Surprisingly, even though an ECPE strip material had significantly lower tensile properties than an ECPE yarn material of the same denier but generally circular cross section, the ballistic resistance of the coated fabric constructed from ECPE strip was significantly higher than the ballistic resistance of the coated fabric constructed from the ECPE yarn.

Most screening studies of ballistic composites employ a .22 caliber, non-deforming steel fragment of specified weight, (19 grains) hardness and dimensions (Mil-Spec. MIL-P-46593A(ORD)). Limited studies were made employing .22 caliber lead bullet weighing 40 grains. The protective power of a structure is normally expressed by citing the impacting velocity at which 50% of the projectiles are stopped, and is designated the $V_{50}$ value.

Usually, a flexible fabric, "soft" armor is a multiple layer structure. The specific weight of the multilayer fabric article is similarly expressed in terms of the areal density (AD). This areal density corresponds to the weight per unit area of the multiple layer structure.

To compare structures having different $V_{50}$ values and different areal densities, the following examples state the ratios of (a) the kinetic energy (Joules) of the projectile at the $V_{50}$ velocity, to (b) the areal density of the fabric (kg/m$^2$). This ratio is designated as the Specific Energy Absorption (SEA).

The following examples are presented to provide a more complete understanding of the invention. The specific techniques, conditions, materials, proportions and reported data set forth to illustrate the principles of the invention are exemplary and should not be construed as limiting the scope of the invention.

EXAMPLE F-1

A low areal density (0.1354 kg/m$^2$) plain weave fabric having 70 ends/inch (28 ends/cm) in both the warp and fill direction was prepared from untwisted yarn sized with low molecular weight polyvinylalcohol on a Crompton and Knowles box loom. After weaving, the sizing was removed by washing in hot water (60°–72° C.). The yarn used for fabric preparation had 19 filaments, yarn denier of 203, modulus of 1304 g/denier, tenacity of 28.4 g/denier, elongation of 3.1% and energy-to-break of 47 J/g. A multilayer fabric target F-1 was comprised of 13 layers of fabric and had a total areal density (AD) of 1.76 kg/m$^2$. All yarn tensile properties were measured on an Instron tester using tire cord barrel clamps, gauge length of 10 inches (25.4 cm), and crosshead speed of 10 inches/minute (25.4 cm/min).

EXAMPLE F-2

Fabric was woven in a manner similar to that used for preparation of fabric F-1, except that a higher denier yarn (designated SY-1) having 118 filaments and approximately 1200 denier, 1250 g denier modulus, 30 g denier tenacity, and 60 J/g energy-to-break) was used to produce a plain weave fabric having areal density of approximately 0.3 kg/m$^2$ and 28 ends/inch (11 ends/cm). Six layers of this fabric were assembled to prepare a ballistic target F-2.

EXAMPLE F-3

A 2×2 basket weave fabric was prepared from our standard yarn (SY-1) having 34 ends/inch (13.4 ends/cm). The yarn had approximately 1 turn/inch and was woven without sizing. The fabric areal density was 0.434 kg/m$^2$, and a target F-3 comprised of 12 fabric layers had an areal density of 5.21 kg/m2

EXAMPLE F-4

This fabric was prepared in an identical manner to that of Example F-1 except that the yarn used had the following properties: denier 270, 118 filaments, modulus 700 g/denier, tenacity 20 g/denier and energy-to-break 52 J/g. The fabric had an areal density of 0.1722 kg/m$^2$. A target F-4 was comprised of 11 layers of this fabric.

EXAMPLE F-5

Yarn SY-1 was used to prepare a high denier non-crimped fabric in the following manner. Four yarns were combined to form single yarns of approximately 6000 denier and these yarns were used to form a non-crimped fabric having 28 ends/inch in both the warp and fill direction. Yarn SY-1, having yarn denier of 1200 was used to knit together a multilayer structure. Fabric areal density was 0.705 kg/m$^2$. A ballistic target F-5 was comprised of seven layers of this fabric.

EXAMPLE F-6

Eight one-foot-square pieces of Kevlar 29 ballistic fabric, manufactured by Clark Schwebel, were assembled to produce a target F-6 having an areal density of 2.32 kg/m$^2$. The fabric was designated Style 713 and was a plain weave fabric comprised of 31 ends per inch of untwisted 1000 denier yarn in both the warp and fill direction.

EXAMPLE F-7

This sample was substantially identical to sample F-6, except that six layers of Kevlar 29 were used to produce a target F-7 having a total target areal density of 1.74 kg/m$^2$.

EXAMPLE FB-1

Ballistic Results Against .22 Caliber Fragments

Fabric targets one-foot-square (30.5 cm) and comprised of multiple layers of fabric were tested against .22 caliber fragments to obtain a V50 value. Fabric properties are shown in Table 1A and Ballistics results are shown in Table 1B.

TABLE 1A

| | FABRIC PROPERTIES | | | |
|---|---|---|---|---|
| Example | Yarn Denier | Yarn Modulus (g/den) | Yarn Energy-to-break (J/g) | Weave Type |
| F-1 | 203 | 1304 | 47 | Plain |
| F-4 | 270 | 700 | 52 | Plain |
| F-2 | 1200 | 1250 | 60 | Plain |
| F-3 | 1200 | 1250 | 60 | 2 × 2 Basket |
| F-5 | 6000 | 1250 | 60 | non-crimped |

TABLE 1B

| | Ballistic Results Against .22 Caliber Fragments | | | |
|---|---|---|---|---|
| Sample No. | Fabric AD (kg/m$^2$) | Target AD (kg/m$^2$) | V 50 (ft/sec) | SEA (J/m$^2$/Kg) |
| F-1 | 0.1354 | 1.76 | 1318 | 50.5 |
| F-4 | 0.1722 | 1.89 | 951 | 24.4 |
| F-2 | 0.316 | 1.90 | 1165 | 36.9 |
| F-3 | 0.434 | 5.21 | 1318 | 17.1 |
| F-5 | 0.705 | 4.95 | 1333 | 18.0 |

Sample F-1 gave the best ballistic results, suggesting that a combination of high modulus yarns and fine weave fabric comprised of low denier yarn has particular merit.

EXAMPLE FB-2

Ballistic Results Against .22 Caliber Lead Bullets

Sample targets were evaluated against .22 caliber lead bullets, and the striking and exit velocities of the bullets were individually recorded. Fabric properties are shown in Table 2A, and ballistic results are shown in Tables 2B and 2C.

TABLE 2A

| Properties of Plain Weave Fabrics | | | | |
|---|---|---|---|---|
| | | Yarn | | |
| Example | Type | Denier | Modulus (g/den.) | Energy-to-Break (J/g) |
| F-1 | ECPE | 203 | 1304 | 47 |
| F-4 | ECPE | 270 | 700 | 52 |
| F-6 | Kevlar 29 | 1000 | 700 | 29 |
| F-7 | Kevlar 29 | 1000 | 700 | 29 |

TABLE 2B

| | Ballistic Results Against .22 Caliber Bullets | | | | |
|---|---|---|---|---|---|
| Example | Fabric AD (kg/m$^2$) | Target AD (kg/m$^2$) | V (in) | V (out) | SEA (Jm$^2$/kg) |
| F-1 | 0.1354 | 1.76 | 1212 | 0 | 100.5 |
| | | | 1198 | 982 | 32.2 |
| | | | 1194 | 838 | 49.5 |
| | | | 1193 | 958 | 34.6 |
| | | | 1171 | 0 | 93.8 |
| | | | 1148 | 0 | 90.2 |
| F-7 | 0.29 | 1.74 | 1175 | 0 | 95.8 |
| | | | 1186 | 760 | 57.5 |
| | | | 1205 | 1040 | 25.5 |
| | | | 1176 | 963 | 31.6 |
| | | | 1216 | 926 | 43.1 |
| F-6 | 0.29 | 2.23 | 1198 | 0 | 74.6 |
| | | | 1214 | 721 | 49.6 |
| | | | 1181 | 0 | 72.5 |
| | | | 1200 | 589 | 56.9 |
| | | | 1181 | 0 | 72.5 |
| F-4 | 0.1722 | 1.89 | 1200 | 1100 | 14.6 |
| | | | 1184 | 1091 | 13.5 |
| | | | 1225 | 1137 | 13.2 |
| | | | 1144 | 1037 | 14.8 |

TABLE 2C

| Sample | Average SEA (Kg/m$^2$) | % Bullets Stopped |
|---|---|---|
| F-1 | 66.8 | 50 |
| F-7 | 50.0 | 20 |
| F-6 | 65.2 | 60 |
| F-4 | 14.0 | 0 |

A comparison of the ballistic results of examples F-1 and F-4 indicates that higher modulus yarns are much superior for ballistic protection against .22 caliber bullets when woven into a fine weave fabric comprised of low denier yarn. These data also indicate that the F-1 fabric is superior to Kevlar ballistic fabric (F-7) in current use, with respect to both the percent of bullets stopped and the average SEA.

EXAMPLE C-1

The individual fabric layers of the target described in Example F-1, after ballistic testing against both 22 caliber fragments and .22 caliber bullets, was soaked overnight in a toluene solution of Kraton D1107 (50 g/liter). Kraton D1107, a commercial product of the Shell Chemical Company, is a triblock copolymer of the polystyrene-polyisoprene-polystyrene having about 14 wt % styrene, a tensile modulus of about 200 psi (measured at 23° C.) and having a Tg of approximately −60° C. The fabric layers were removed from the solvent and hung in a fume hood to allow the solvent to evaporate. A target C-1, containing 6 wt % elastomer, was reassembled with 13 fabric layers for additional ballistic testing.

EXAMPLE C-2A and C-2B

Six one-foot-square fabric layers of the type described in example F-2 were assembled together and designated sample C-2A.

Six fabric layers identical to those of example C-2A, were immersed in a toluene solution of Kraton G1650 (35 g/liter) for three days and were hung in a fume hood to allow solvent evaporation. Kraton G1650, a triblock thermoplastic elastomer produced by Shell Chemical Co, has the structure polystrene-polyethylenebutylene-polystyrene and has about 29 wt % styrene. Its tensile modulus is about 2000 psi (measured at 23° C.), and its Tg is approximately −60° C. The panel layers each had an areal density of 1.9 kg/m$^2$ and contained 1 wt % rubber. The layers were assembled together for ballistic testing and were designated sample C-2B.

EXAMPLES C4-C10

Each target in this series was comprised of six one-foot-square layers of the same fabric, which had been prepared as described in example F-2. The fiber areal density of these targets was 1.90 kg/m$^2$.

Sample C-4 was comprised of untreated fabric.

Sample C-5 was comprised of fabric coated with 5.7 wt % Kraton G1650. The fabric layers were soaked in a toluene solution of the Kraton 1650 (65 g/liter) and then assembled after the solvent had been evaporated.

Sample C-6 was prepared in a similar manner to sample C-5 except that after the sample had been dipped and dried, it was redipped to produce a target having 11.0 wt % coating.

Sample C-7 was prepared by sequentially dipping the fabric squares in three solutions of Kraton D1107/dichloromethane to produce a target having 10.8 wt % coating. Fabric layers were dried between successive coatings. Concentrations of the Kraton D1107 thermoplastic, low modulus elastomers in the three coating solutions were 15 g/L, 75 g/L and 15 g/L, in that order.

Sample C-8 was prepared by dipping fabric layers into a colloidal silica solution, prepared by adding three volume parts of de-ionized water to one volume part of Ludox AM, a product of DuPont Corporation which is an aqueous colloidal silica dispersion having 30 wt % silica of average particle size 12 nm and surface area of 230 m$^2$/g.

Sample C-9 was prepared from electron beam irradiated fabric irradiated under a nitrogen atmosphere to 1 Mrad using an Electracurtain apparatus manufactured by Energy Sciences Corporation. The fabric squares were dipped into a Ludox AM solution diluted with an equal volume of deionized water.

Sample C10 was prepared in a similar manner to example C-9, except that the fabric was irradiated to 2 Mrads and was subsequently dipped into undiluted Ludox AM. This level of irradiation had no significant effect on yarn tensile poroperties.

EXAMPLE C-11

A plain weave ribbon fabric was prepared from polyethylene ribbon 0.64 cm in width, having modulus of 865 g/denier and energy-to-break of 46 J/g. Fabric panels (layers) one-foot-square (30.5 cm) were soaked in dichloromethane solution of Kraton D1107 (10 g/liter) for 24 hours and then removed and dried. The 37 panels, having a total ribbon areal density of 1.99 kg/m$^2$ and 6 wt % rubber coating were assembled into a multilayer target sample C-11 for ballistic testing.

EXAMPLE CB-1

As shown below, the damaged target C-1 stopped all .22 caliber bullets fired into it. These results were superior to those obtained for the same fabric before it was rubber coated and much superior to the Kevlar ballistic fabrics. (See Example FB-2.)

| V (in) (ft/sec) | V (out) (ft/sec) | SEA (Jm$^2$/kg) |
| --- | --- | --- |
| 1218 | 0 | 101.5 |
| 1182 | 0 | 95.6 |
| 1172 | 0 | 94.0 |
| 1169 | 0 | 93.5 |
| 1159 | 0 | 91.9 |

Although this fabric was highly damaged, a .22 caliber fragment was fired into the target at an impacting velocity of 1381 ft/sec and was stopped, corresponding to an SEA of 55.5 Jm$^2$/kg. This result indicates that the low modulus rubber coating also improves ballistic resistance against .22 caliber fragments. The V50 value for the uncoated fabric (example F-1) was 1318 ft/sec, corresponding to an SEA of 50.5 Jm$^2$/kg. The highest partial penetration velocity for Example F-1 was 1333 ft/sec, corresponding to an SEA of 51.7 Jm$^2$/kg.

Finally, this highly damaged sample was ballistically tested against .38 caliber bullets according to test procedure NILECJ-STD-0101.01. Three .38 caliber bullets having impacting velocities of 780, 803 and 831 ft/sec, respectively, were stopped by the target, and the bullet indentations into the clay backing were less than 1.2 inches. The target sample easily met the specification. Even though this target had an areal density of only 1.76 kg/m$^2$, it met or exceeded the U.S. Military specifications for Type 1 and Type 1A Kevlar 29 targets having a greater areal density of 2.24 kg/m$^2$ (Specification MIL-C-44050). This was accomplished in spite of the fact that the total number of ballistic impacts on this single target greatly exceeded requirements. It is, therefore, quite apparent that the fabric articles of the present invention can provide required levels of ballistic protection while employing a lighter weight of material.

EXAMPLE CB-2

Targets C-2A and C-2B were marked with a felt pen to divide it into two, 6in X 12in rectangles. The V50 values for each target was determined against .22 caliber fragments using only one of the rectangles (one half of the target). Each target was immersed in water for ten minutes, and the hung for three minutes before determination of a V50 value using the undamaged rectangle. Data shown below clearly indicate that the small ammount of rubber coating has a beneficial effect on the ballistic performance of the fabric target when wet.

| | V 50 (ft/sec) | |
| --- | --- | --- |
| | Target C-2A (untreated) | Target C-2B (1 wt % Elastomer) |
| DRY | 1175 | 1250 |
| WET | 985 | 1200 |

EXAMPLE CB-3

(Ballistic studies using 28×28 plain weave, coated fabrics)

Ballistic testing using .22 caliber fragments against six-layer fabric targets having fiber areal density of 1.90 kg/m² showed that elastomeric coatings improved ballistic performance, but silica coatings were ineffective.

| Sample | Coating | V50 (ft/sec) | SEA (Jm²/kg) |
|---|---|---|---|
| C-4 | none | 1165 | 36.9 |
| C-5 | Kraton G1650 (5.7 wt %) | 1228 | 41.0 |
| C-6 | Kraton G1650 (11 wt %) | 1293 | 45.4 |
| C-7 | Kraton D1107 (10.8 wt %) | 1259 | 43.1 |
| C-8 | Silica (3.4 wt %) | 1182 | 38.0 |
| C-9 | Silica (7.2 wt %) | 1150 | 36.0 |
| C-10 | Silica (17 wt %) | 1147 | 35.8 |

Sample C-11 was tested ballistically and exhibited a V50 value of 1156 ft/sec determined against .22 caliber fragments. This corresponded to a SEA value of 34.4 Jm²/kg. This target exhibited good ballistic properties in spite of the fact that ribbon stress-strain properties were inferior to those of most of the ECPE yarns used in this study.

A V50 value of 1170 ft/sec against .22 caliber bullets was obtained for sample C-11, whereas samples C-5, C-6 and C-7 allowed bullets having a striking velocity of approximately 1150 ft/sec to pass through the target with a velocity loss of less than 250 ft/sec. This indicates that the ribbon fabric is particularly effective against .22 caliber lead bullets.

Having thus described the invention in rather full detail, it will be understood that these details need not be strictly adhered to but that various changes and modifications may suggest themselves to one skilled in the art, all falling within the scope of the invention as defined by the subjoined claims.

We claim:

1. An article of manufacture comprising:
    at least one network comprising fiber or yarn selected from the group of extended chain polyethylene and extended chain polypropylene fibers, extended chain polyvinyl alcohol fiber and extended chain polyacrylonitrile fiber wherein said fiber or yarn have a denier of not more than about 500 and a tensile modulus of at least about 200 g/denier.

2. An article as recited in claim 1, wherein said fiber or yarn are polypropylene fiber or yarn having a tensile modulus of at least about 200 g/den.

3. An article as recited in claim 1, wherein said polyolefin fiber or yarn are polyethylene fiber and yarn having a tensile modulus of at least about 500 g/den.

4. An article as recited in claim 1, wherein said fiber or yarn have a tensile modulus of at least about 500 g/denier and an energy-to-break of at least about 22 J/g.

5. An article as recited in claim 1, wherein said fiber or yarn have a tensile modulus of at least about 1000 g/denier and an energy-to-break of at least 50 J/g.

6. An article as recited in claim 1 wherein said fiber or yarn have a tensile modulus of at least about 1300 g/denier and an energy-to-break of at least about 55 J/g.

7. An article as recited in claim 1, wherein said fiber or yarn have a denier of not more than about 300.

8. An article as recited in claim 1, wherein said fiber or yarn have a denier of not more than about 250.

9. An article as recited in claim 1, wherein said fiber or yarn has a tensile modulus of at least about 1300 g/den.

10. An article as recited in claim 1, wherein said network comprises yarn having a tensile modulus of at least about 1800 g/den.

11. An article as recited in claim 1, wherein said network has a plain weave pattern.

12. An article as recited in claim 1 further comprising:
    a low modulus elastomeric material, which coats the fiber or yarn of said network and has a tensile modulus of less than about 6,000 psi (41,300 kPa).

13. An article as recited in claim 12, wherein said elastomeric material has tensile modulus of less than about 5,000 psi.

14. An article as recited in claim 12, wherein said elastomeric material has a tensile modulus of less than about 1,000 psi.

15. An article as recited in claim 12, wherein said elastomeric material has a tensile modulus of less than about 500 psi.

16. An article as recited in claim 12 comprising a plurality of network arranged as multiple layers, the fiber or yarn of each of said layers being individually coated with said low modulus elastomeric material.

17. An article as recited in claim 16, wherein said layers have an arrangement in which the fiber alignment directions in selected layers are rotated with respect to the alignment direction of another layer.

18. An article as recited in claim 12 wherein said network has a plain weave pattern.

19. An article as recited in claim 12, wherein said low modulus elastomeric material comprises less than about 10 vol % of said layer.

20. An article as recited in claim 12, wherein said elastomeric material consists essentially of a polystyrene-polyisoprene-polystyrene, tri-block copolymer.

21. An article as recited in claim 12, wherein said elastomeric material consists essentially of a polystyrene-polyethylene/butylene-polystyrene tri-block copolymer.

22. An article as recited in claim 12, wherein the network comprises yarn having a denier of less than about 250, the fiber of said yarn having a modulus of at least about 1200 g/den, the areal density of said yarn of the network is less than about 0.18 kg/m², and the network has a plain weave pattern.

23. An article as recited in claim 22, wherein the yarn of the network has about 5 wt % coating of said elastomeric material.

* * * * *